(12) United States Patent
Dahl et al.

(10) Patent No.: US 12,444,243 B2
(45) Date of Patent: Oct. 14, 2025

(54) TECHNOLOGY FOR ASSESSING ACCIDENT EVENTS

(71) Applicant: Quanata, LLC, San Francisco, CA (US)

(72) Inventors: Eric Dahl, Newman Lake, WA (US); Steven J. Harris, Saratoga, CA (US); Kenneth J. Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 18/765,658

(22) Filed: Jul. 8, 2024

(65) Prior Publication Data

US 2024/0362957 A1    Oct. 31, 2024

Related U.S. Application Data

(63) Continuation of application No. 17/462,128, filed on Aug. 31, 2021, now Pat. No. 12,033,438, which is a continuation of application No. 16/390,915, filed on Apr. 22, 2019, now Pat. No. 11,127,227, which is a continuation of application No. 15/874,400, filed on Jan. 18, 2018, now Pat. No. 10,311,655.

(60) Provisional application No. 62/447,764, filed on Jan. 18, 2017.

(51) Int. Cl.
| | |
|---|---|
| G07C 5/00 | (2006.01) |
| G06Q 40/08 | (2012.01) |
| G07C 5/08 | (2006.01) |
| G06Q 50/26 | (2012.01) |

(52) U.S. Cl.
CPC ............. *G07C 5/008* (2013.01); *G06Q 40/08* (2013.01); *G07C 5/0808* (2013.01); *G07C 5/085* (2013.01); *G06Q 50/26* (2013.01)

(58) Field of Classification Search
CPC ...... G07C 5/008; G07C 5/0808; G07C 5/085; G06Q 40/08; G06Q 50/26
See application file for complete search history.

(56) References Cited

U.S. PATENT DOCUMENTS

| | | | | |
|---|---|---|---|---|
| 9,019,092 | B1* | 4/2015 | Brandmaier | B60R 21/0136 340/436 |
| 10,311,655 | B2* | 6/2019 | Dahl | G06Q 40/08 |
| 2015/0127570 | A1 | 5/2015 | Doughty et al. | |

(Continued)

*Primary Examiner* — James J Yang
(74) *Attorney, Agent, or Firm* — BRYAN CAVE LEIGHTON PAISNER LLP

(57) ABSTRACT

A computer-implemented method implemented by one or more processors for assessing accident events, the computer-implemented method including: determining, based on first sensor data captured by one or more first sensors associated with a first vehicle, that an accident event occurred; and after determining that the accident event occurred: sending, to an electronic device associated with a second vehicle, a request for second sensor data captured by one or more second sensors of the electronic device associated with the second vehicle; receiving, from the electronic device, the second sensor data; analyzing the second sensor data to determine that the second sensor data is related to the accident event; and aggregating the first sensor data with the second sensor data. Other embodiments are described.

20 Claims, 5 Drawing Sheets

(56) References Cited

U.S. PATENT DOCUMENTS

2018/0204394 A1* 7/2018 Dahl .................... G06Q 40/08
2020/0101917 A1* 4/2020 Kumar .................. G05D 1/228

* cited by examiner

TECHNOLOGY FOR ASSESSING ACCIDENT EVENTS

CROSS-REFERENCE TO RELATED APPLICATIONS

The present application is a continuation application of U.S. patent application Ser. No. 17/462,128, filed on Aug. 31, 2021, to be issued as U.S. Pat. No. 12,033,438, which is a continuation of U.S. patent application Ser. No. 16/390, 915, filed Apr. 22, 2019, patented as U.S. Pat. No. 11,127, 227, which is a continuation of U.S. patent application Ser. No. 15/874,400, filed Jan. 18, 2018, patented as U.S. Pat. No. 10,311,655, which claims priority to U.S. Provisional Patent Application No. 62/447,764, filed Jan. 18, 2017, each of which are hereby incorporated by reference in their entirety.

FIELD

The present disclosure is directed to assessing accident events involving one or more vehicles. More particularly, the present disclosure is directed to systems and methods for collecting and aggregating data from multiple vehicle devices in proximity to an accident event.

BACKGROUND

Individuals have been operating and traveling in vehicles as a means of transportation for decades. Unfortunately, vehicles are regularly involved in accident events that may result in or lead to damage, injuries, congestion, or other conditions. Gathering information associated with accident events is difficult and unreliable. In particular, information related to accident events is verbally articulated by individuals either involved in or who witnessed the accident events. However, this information may sometimes be biased and/or certain individuals may not be able to accurately recall circumstances. Because this information is used for various insurance purposes (e.g., filing insurance claims), for law enforcement purposes (e.g., gathering police reports), or for other reasons, it is important to collect accurate information.

Accordingly, there is an opportunity for systems and methods to dynamically and automatically collect and aggregate information related to accident events.

SUMMARY

According to embodiments, a computer-implemented method in an electronic device of assessing accident events is provided. The method may include accessing a set of sensor data from a set of sensors associated with a vehicle, determining, from the set of sensor data, that an accident event occurred, and, in response to determining that the accident event occurred, automatically retrieving, from at least one additional electronic device associated with at least one additional vehicle via a wireless network connection, a set of additional sensor data. The method may further include analyzing the set of additional sensor data to determine that the set of additional sensor data indicates the accident event, and aggregating the set of sensor data with the set of additional sensor data.

In another embodiment, an electronic device configured to assess accident events is provided. The electronic device may include a transceiver configured to communicate via a wireless network connection, a memory configured to store non-transitory computer executable instructions, and a processor configured to interface with the transceiver and the memory. The processor may be configured to execute the non-transitory computer executable instructions to cause the processor to access a set of sensor data from a set of sensors associated with a vehicle, determine, from the set of sensor data, that an accident event occurred, and, in response to determining that the accident event occurred, automatically retrieve, from at least one additional electronic device associated with at least one additional vehicle via the transceiver, a set of additional sensor data. The processor may be further configured to analyze the set of additional sensor data to determine that the set of additional sensor data indicates the accident event, and aggregate the set of sensor data with the set of additional sensor data.

Some embodiments can include a computer-implemented method in an electronic device of assessing accident events. The computer-implemented method can include accessing a set of sensor data from a set of sensors associated with a vehicle. The computer-implemented method also can include determining, by a processor from the set of sensor data, that an accident event occurred. After determining that the accident event occurred, the computer-implemented method further can include sending, to an additional electronic device associated with an additional vehicle via a wireless network connection, a request for a set of additional sensor data, and receiving, from the additional electronic device via the wireless network connection, a set of additional sensor data. The additional electronic device can adjust operations according to the request prior to collecting the set of additional sensor data. The computer-implemented method further can include analyzing, by the processor, the set of additional sensor data to determine that the set of additional sensor data indicates the accident event. The computer-implemented method additionally can include aggregating the set of sensor data with the set of additional sensor data.

Many embodiments can include an electronic device configured to assess accident events. The electronic device also can include a transceiver configured to communicate via a wireless network connection. The electronic device further can include a memory configured to store non-transitory computer executable instructions. The electronic device additionally can include a processor configured to interface with the transceiver and the memory. The processor can be configured to execute the non-transitory computer executable instructions to cause the processor to perform certain acts. The acts can access a set of sensor data from a set of sensors associated with a vehicle. The acts also can determine, from the set of sensor data, that an accident event occurred. After determining that the accident event occurred, the acts can send, to an additional electronic device associated with an additional vehicle via the transceiver, a request for a set of additional sensor data. The acts can receive, from the additional electronic device via the transceiver, the set of additional sensor data. The additional electronic device can adjust operations according to the request prior to collecting the set of additional sensor data. The acts also can analyze the set of additional sensor data to determine that the set of additional sensor data indicates the accident event. The acts further can aggregate the set of sensor data with the set of additional sensor data.

A number of embodiments can include a non-transitory computer-readable storage medium having stored thereon a set of instructions, executable by a processor, for assessing accident events. The set of instructions can include accessing a set of sensor data from a set of sensors associated with a vehicle. The set of instructions also can include determining, from the set of sensor data, that an accident even occurred. After determining that the accident event occurred, the set of instructions further can include sending, to an additional electronic device associated with an additional vehicle via a wireless network connection, a request for a set of additional sensor data. The set of instructions can include receiving, from the additional electronic device via the wireless network connection, the set of additional sensor data. The additional electronic device can adjust operations according to the request prior to collecting the set of additional sensor data. The set of instructions also can include analyzing the set of additional sensor data to determine that the set of additional sensor data indicates the accident event. The set of instructions further can include aggregating the set of sensor data with the set of additional sensor data.

Several embodiments can include a computer-implemented method in an electronic device of assessing accident events. The computer-implemented method can include accessing a set of sensor data from a set of sensors associated with a vehicle. The computer-implemented method also can include determining, from the set of sensor data, that an accident event occurred. In response to determining that the accident event occurred, the computer-implemented method further can include automatically retrieving, from at least one additional electronic device associated with at least one additional vehicle via a wireless network connection, a set of additional sensor data. The computer-implemented method additionally can include analyzing the set of additional sensor data to determine that the set of additional sensor data indicates the accident event. The computer-implemented method also can include aggregating the set of sensor data with the set of additional sensor data.

Some embodiments can include an electronic device configured to assess accident events. The electronic device can include a transceiver configured to communicate via a wireless network connection. The electronic device also can include a memory configured to store non-transitory computer executable instructions. The electronic device further can include a processor configured to interface with the transceiver and the memory. The processor can be configured to execute the non-transitory computer executable instructions. The non-transitory computer executable instructions can access a set of sensor data from a set of sensors associated with a vehicle. The non-transitory computer executable instructions also can determine, from the set of sensor data, that an accident event occurred. In response to determining that the accident event occurred, the non-transitory computer executable instructions can automatically retrieve, from at least one additional electronic device associated with at least one additional vehicle via the transceiver, a set of additional sensor data. The electronic device also can analyze the set of additional sensor data to determine that the set of additional sensor data indicates the accident event. The electronic device further can aggregate the set of sensor data with the set of additional sensor data.

Various embodiments can include a computer-implemented method implemented by one or more processors for assessing accident events. The computer-implemented method can include determining, based on first sensor data captured by one or more first sensors associated with a first vehicle, that an accident event occurred. After determining that the accident event occurred, the computer-implemented method also can include sending, to an electronic device associated with a second vehicle, a request for second sensor data captured by one or more second sensors of the electronic device associated with the second vehicle and receiving, from the electronic device, the second sensor data. The computer-implemented method further can include analyzing the second sensor data to determine that the second sensor data is related to the accident event. The computer-implemented method also can include aggregating the first sensor data with the second sensor data.

Several embodiments can include a system including one or more processors and one or more non-transitory computer-readable media storing computing instructions that, when executed on the one or more processors, cause the one or more processors to perform certain operations. The operations can include determining, based on first sensor data captured by one or more first sensors associated with a first vehicle, that an accident event occurred. After determining that the accident event occurred, the operations also can include sending, to an electronic device associated with a second vehicle, a request for second sensor data captured by one or more second sensors of the electronic device associated with the second vehicle, and receiving, from the electronic device, the second sensor data. The operations further can include analyzing the second sensor data to determine that the second sensor data is related to the accident event. The operations also can include aggregating the first sensor data with the second sensor data.

A number of embodiments can include one or more non-transitory computer-readable media storing computing instructions that, when executed by one or more processors, cause the one or more processors to perform certain operations. The operations can include determining, based on first sensor data captured by one or more first sensors associated with a first vehicle, that an accident event occurred. After determining that the accident event occurred, the operations also can include sending, to an electronic device associated with a second vehicle, a request for second sensor data captured by one or more second sensors of the electronic device associated with the second vehicle, and receiving, from the electronic device, the second sensor data. The operations further can include analyzing the second sensor data to determine that the second sensor data is related to the accident event. The operations also can include aggregating the first sensor data with the second sensor data.

DETAILED DESCRIPTION

Figure 1:
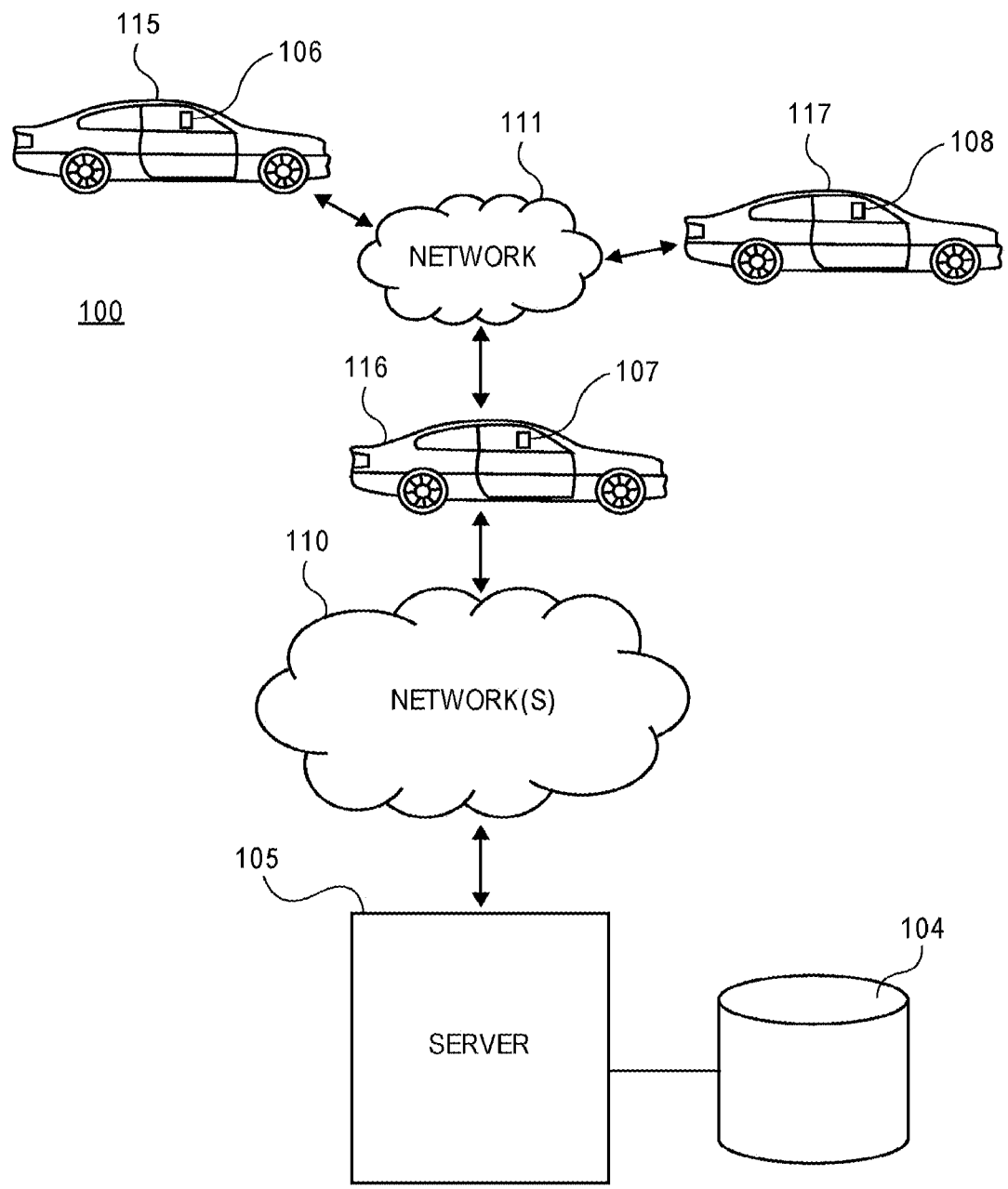
FIG. 1 depicts an overview of an exemplary system of components configured to facilitate various functionalities, in accordance with some embodiments.

The present embodiments may relate to, inter alia, automatically collecting and compiling information that may be associated with an accident event, in response to the occurrence of the accident event. Currently, when an accident event occurs, information associated with the accident event typically consists of information that is articulated by any individuals involved in the accident event. However, this information may be biased or generally inaccurate.

According to the present embodiments, systems and methods may leverage devices within a proximity to an accident event, or devices otherwise able to connect to a device that detects the accident event. In operation, a vehicle device may determine, from sensor data, whether an accident event has occurred. If an accident event has occurred, the vehicle device may connect to and retrieve additional information (e.g., in the form of additional sensor data) from one or more additional devices within a proximity of the accident event, such as via a mesh network connection.

The vehicle device may further examine the additional information to determine if the additional information indicates the accident event, in which case the vehicle device may aggregate the additional information with the original sensor data. The vehicle device may store or transmit the aggregated data to a back end server for further processing. Accordingly, the aggregated data may provide additional information related to the accident event that accurately indicates the accident event and would otherwise not be available through conventional information collection.

The systems and methods therefore offer numerous benefits. In particular, the systems and methods dynamically and automatically collect data and information from additional electronic devices in a vicinity of an accident event in response to the occurrence of the accident event, which affords the collection of timely and accurate data and information associated with the accident event. Further, the compilation of the additional data and information enables effective and accurate assessment of an accident event as well as the facilitation of certain applications, such as the determination of fault(s) associated with the accident event. It should be appreciated that other benefits are envisioned.

The systems and methods discussed herein address a business challenge, namely a business challenge related to improving how the circumstances and causes of accident events are assessed. This is particularly apparent when there may be multiple versions of the causes of an accident event. In conventional situations, witnesses (including those involved in an accident event) will articulate the circumstances of the accident event to proper individuals (e.g., law enforcement or insurance companies). In contrast, the systems and methods utilize multiple electronic devices connected via one or more wireless connections to dynamically retrieve various sensor data that may be relevant to the circumstances of the accident event.

Therefore, the systems and methods do not merely recite the performance of some business practice known from the pre-Internet world (assessing accident events) along with the requirement to perform it on the Internet. Instead, the systems and methods are necessarily rooted in computer technology in order to overcome a problem specifically airing in computer networks.

Further, it should be appreciated that the systems and methods may include specialized (i.e., non-generic) or dedicated components capable of performing specialized (i.e., non-generic) or dedicated computer functions. In particular, the systems and methods employ various device sensors that are specifically configured to collect certain data. Further, electronic devices interface with the specialized sensors to collect the data and analyze the data.

According to implementations, the systems and methods may support a dynamic, real-time or near-real-time collection, analysis, and communication of any data that may be associated with the assessments. In particular, the systems and methods may dynamically and automatically request and collect operation data from vehicles in real-time or near-real-time, may automatically and dynamically analyze the collected data, and may automatically and dynamically identify accident events.

The term "accident event" as used herein may be used to refer to any accident or incident involving one or more vehicles that collide with each other, and/or make contact with one or more other objects and/or individuals. It should be appreciated that an accident event may also refer to an instance in which a vehicle breaks down, experiences a malfunction, or otherwise ceases to operate. Certain accident events may result in one or more affected or impacted individuals.

FIG. 1 illustrates an overview of a system 100 of components configured to facilitate the systems and methods. It should be appreciated that the system 100 is merely exemplary and that alternative or additional components are envisioned.

As illustrated in FIG. 1, the system 100 depicts a set of vehicles 115, 116, 117. Although FIG. 1 depicts three (3) vehicles, it should be appreciated that fewer or additional vehicles are envisioned. Each of the vehicles 115, 116, 117 may have at least one associated individual, such as an operator and/or a passenger of the respective vehicle 115, 116, 117.

Each of the vehicles 115, 116, 117 may have an associated electronic device 106, 107, 108. According to embodiments, each of the electronic devices 106, 107, 108 may be configured with any combination of software and hardware components. In some implementations, each of the electronic devices 106, 107, 108 may be included as part of an on-board diagnostic (OBD) system or any other type of system configured to be installed in the respective vehicle 115, 116, 117, such as an original equipment manufacturer (OEM) system. In other implementations, each of the electronic devices 106, 107, 108 may belong to the respective individuals. In particular, the electronic devices 106, 107, 108 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like.

Each of the electronic devices 106, 107, 108 may include a set of sensors configured to detect and record various telematics data associated with the respective vehicles 115, 116, 117. In some implementations, each of the electronic devices 106, 107, 108 may be configured to communicate with (i.e., request, retrieve, or receive data from) a set of sensors disposed within the respective vehicles 115, 116, 117. According to embodiments, the set of sensors included in the electronic devices 106, 107, 108 or otherwise configured to communicate with the electronic devices 106, 107, 108 may be of various types. For example, the set of sensors may include a location module (e.g., a global positioning system (GPS) chip), an image sensor, an accelerometer, an ignition sensor, a clock, speedometer, a torque sensor, a throttle position sensor, a compass, a yaw rate sensor, a tilt sensor, a steering angle sensor, a brake sensor, a collision sensor, a damage sensor, and/or other sensors. It should be appreciated that additional sensors are envisioned.

As illustrated in FIG. 1, the electronic devices 106, 107, 108 may be configured to communicate with each other via a network connection 111. According to embodiments, the network connection 111 may support one or more short range communication protocols such as radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies. Generally, the network connection 111 enables the electronic devices 106, 107, 108 to form a "mesh" network, whereby the electronic devices 106, 107, 108 may automatically connect to one another when in range. When connected, the electronic devices 106, 107, 108 may request, retrieve, access, and/or transmit data there amongst.

The system 100 may further include a server 105 that may be configured to communicate with the electronic devices 106, 107, 108 via one or more networks 110. In certain embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The server 105 may be configured to interface with or support a memory or storage 107 capable of storing various data.

According to embodiments, one of the electronic devices 106, 107, 108 may collect sensor/operation data from one or more sensors and determine, from the collected data, that an accident event has occurred. In response to determining that the accident event has occurred, the electronic device may retrieve additional sensor/operation data from the other electronic devices 106, 107, 108, and may determine that the additional sensor/operation data indicates the accident event.

The electronic device may compile or aggregate the collected sensor/operation data such that the compiled/aggregated data includes various data, from multiple sources, that indicates the accident event. The electronic device may accordingly process the compiled/aggregated data for various applications. In an embodiment, the electronic device may transmit the compiled/aggregated data to the server 105 via the network(s) 110, where the server 105 may alternatively or additionally process the compiled/aggregated data for various applications.

Figure 2:
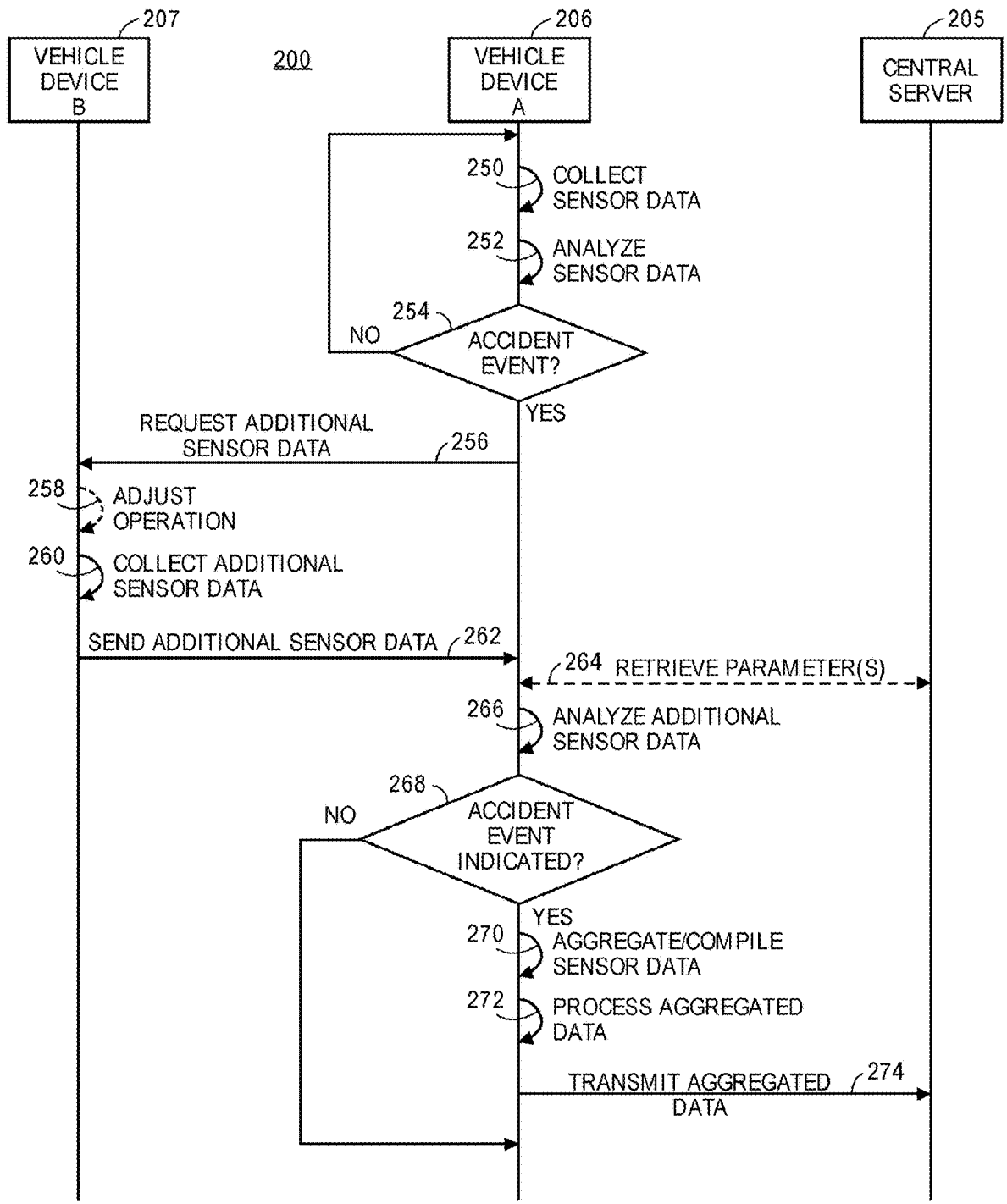
FIG. 2 depicts an exemplary signal diagram associated with assessing accident events, in accordance with some embodiments.

FIG. 2 depicts a signal diagram 200 associated with certain functionalities related to aggregating information associated with accident events. The signal diagram 200 includes various components including: a server 205 (such as the central server 105 as discussed with respect to FIG. 1), a vehicle device A 206, and a vehicle device B 207. Although FIG. 2 depicts two vehicle devices, it should be appreciated that additional vehicles are envisioned.

It should be appreciated that each of vehicle device A 206 and vehicle device B 207 may belong to a passenger or operator of the associated vehicle, or may be an on-board device installed within the associated vehicle. According to embodiments, the vehicle devices 206, 207 may interface and communicate with each other and with the server 205 according to the signal diagram 200. In particular, each of the vehicle devices 206, 207 may support and execute an application configured to facilitate the communications and functionalities as described herein.

The signal diagram 200 may begin with vehicle device A 206 collecting (250) sensor data. In embodiments, vehicle device A 206 may collect the sensor data continuously (or periodically) and during normal operation of the vehicle, or may collect the sensor data in response to a certain trigger. For example, vehicle device A 206 may collect the sensor data in response to certain operation data meeting or exceeding a threshold value (e.g., vehicle sensors detecting vehicle damage, a strong braking event, etc.). Vehicle device A 206 may collect the data from various of the sensors integrated therein, sensors in the vehicle to which the device 206 may connect, or sensors otherwise associated with the vehicle.

According to embodiments, the sensor data may include data indicative of general vehicle operation including, but not limited to, times and dates when the vehicle is operating (including start time and end time), travel locations or routes (including origin locations and destination locations), distances traveled, speed or velocity, various telematics data (e.g., hard turns, sharp accelerations, hard brakes, etc.), image data, audio data, and/or the like.

Vehicle device A 206 may analyze (252) the sensor data. In particular, vehicle device A 206 may analyze the sensor data to determine whether an accident event has occurred. In some implementations, the sensor data may explicitly indicate an accident event. For example, the sensor data may indicate damage to the vehicle. In other implementations, the sensor data may not explicitly indicate an accident event, in which case the vehicle device A 206 may determine a certain likelihood of an accident event based on the sensor data, where vehicle device A 206 may deem that an accident event occurred when the certain likelihood at least meets a threshold value. Vehicle device A 206 may also identify or determine a time and a location associated with the accident event (i.e., when and where the accident event occurred). Further, in embodiments, vehicle device A 206 may access or retrieve parameters to be used in the determination.

In embodiments, vehicle device A 206 may analyze multiple types and combinations of operation data, where vehicle device A 206 may determine whether the accident event has occurred based on multiple calculated likelihoods, and/or other data. It should be appreciated that vehicle device A 206 may perform or facilitate the determination according to any calculation, technique, algorithm, and/or the like.

Vehicle device A 206 may determine (block 254) whether an accident occurred (or whether the determined likelihood of an accident event meets or exceeds a threshold value). If an accident event did not occur ("NO"), processing may return to (250), or may proceed to other functionality.

If an accident event did occur ("YES"), vehicle device A 206 may request (256) additional sensor data from vehicle device B 207. In an implementation, vehicle device A 206 may connect to vehicle device B 207 (and to one or more additional devices) via a short range communication, such as a mesh network connection. It should be appreciated that various communication protocols are envisioned, such as RFID, Bluetooth®, BLE, IrDA, NFC, ZigBee, and/or others. In embodiments, the request may indicate a time and a location associated with the accident event. The request may also request specific data from vehicle device B 207. For example, the request may specify image data, audio data, and velocity data.

In an implementation, vehicle device A 206 may automatically connect to vehicle device B 207 at any point in time, such as when vehicle device A 206 is within connectable range of vehicle device B 207. Further, vehicle device B 207 may continuously (or periodically) transmit captured sensor data to vehicle device A 206 when the devices 206, 207 are connected. Accordingly, vehicle device A 206 need not connect to vehicle device B 207 after determining that the accident event occurred, and need not have to explicitly request data from vehicle device B 207. In another implementation, vehicle device A 206 may dynamically and automatically connect to vehicle device B 207 after determining that the accident event occurred.

Vehicle device B 207 may optionally adjust (258) its operation according to the request from vehicle device A 206. For example, if the request specifies the need for image data and includes a location (e.g., GPS coordinates) of the accident event, vehicle device B 207 may orient one or more image sensors in the direction of the indicated location. Vehicle device B 207 may also collect (260) additional sensor data according to the request. In particular, vehicle device B 207 may record, access, collect, or retrieve any recorded or real-time (or near-real-time) sensor data from various of the sensors integrated therein, sensors in the vehicle to which the device 207 may connect, or sensors otherwise associated with the vehicle. In some implementations in which the request indicates a time of the accident event, vehicle device B 207 may access recorded sensor data that corresponds to the time of the accident event (such as sensor data recorded immediately before, during, and/or after the accident event). For example, if the accident event occurred at 08:05:36, the request may specify certain sensor data from vehicle device B 207 that was recorded or collected from 8:05:15 through 8:06:00.

Vehicle device B 207 may send (262) the additional sensor data to vehicle device A 206. According to embodiments, vehicle device B 207 may send the additional sensor data via short range communication, such as a mesh network connection. In an implementation, vehicle device B 207 (and optionally other devices connected to vehicle device A 206 via a mesh network connection) may periodically or continuously send sensor data to vehicle device A 206 as the sensor data is recorded (i.e., vehicle device B 207 may send sensor data to vehicle device A 206 without a request from vehicle device A 206).

Vehicle device A 206 may perform various functionalities to determine whether the additional sensor data indicates or is relevant to the accident event. In an optional implementation, vehicle device A 206 may retrieve (264) parameters from the central server 205 that may be relevant in making the determination. For example, vehicle device A 206 may retrieve certain data or information associated with certain sensor data that may be indicative of accident events, such as image processing information, threshold data, and/or the like.

Vehicle device A 206 may analyze (266) the additional sensor data to determine whether and how the additional sensor data indicates or relates to the accident event. In embodiments, vehicle device A 206 may analyze the additional sensor data in the same manner that it analyzes the sensor data in (252). Based on the analysis, vehicle device A 206 may determine (268) whether the accident event is indicated in the additional sensor data. For example, if the additional sensor data includes image data, vehicle device A 206 may determine that the image data depicts the accident event or anything related to the accident event (e.g., other vehicles in the vicinity of the accident event). If vehicle device A 206 determines that the accident event is not indicated ("NO"), processing may end or proceed to other functionality.

In contrast, if vehicle device A 206 determines that the accident event is indicated ("YES"), vehicle device A 206 may aggregate or compile (270) the initial sensor data collected by vehicle device A 206 and the additional sensor data collected by vehicle device B 207. In an implementation, vehicle device A 206 may organize the initial sensor data and the additional sensor data according to the type of data (e.g., audio data, image data, etc.), may sync the initial sensor data and the additional sensor data according to the times that the data was collected, and/or may aggregate or compile the data according to other techniques.

Vehicle device A 206 may also process (272) the aggregated/compiled sensor data. In particular, vehicle device A 206 may identify, from the aggregated/compiled sensor data, information that may be relevant to the accident event. For example, vehicle device A 206 may identify images that may depict the accident event, audio that may indicate the accident event, telematics data that may provide a snapshot of operating conditions before and after the accident event, and/or other relevant information.

Vehicle device A 206 may transmit (274) the aggregated/compiled data to the central server 205. In an embodiment, vehicle device A 206 may transmit any processed data or relevant identified information to the central server 205. In another embodiment, the central server 205 may additionally or alternatively process the aggregated/compiled data, such as described with respect to (272).

Figures 3A, 3B:
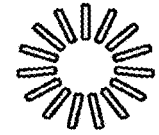
FIGS. 3A and 3B depict exemplary user interfaces associated with assessing accident events, in accordance with some embodiments.

FIGS. 3A and 3B illustrate exemplary interfaces associated with assessing accident events. One or more electronic devices (e.g., a mobile device, such as a smartphone) may be configured to display the interfaces and/or receive selections and inputs via the interfaces, where the electronic device(s) may be associated with an operator or passenger of a vehicle, or may be integrated into the vehicle. For example, a dedicated application that is configured to operate on the electronic device may display the interfaces. It should be appreciated that the interfaces are merely exemplary and that alternative or additional content is envisioned.

FIG. 3A illustrates an interface 350 indicating that an accident event was detected. The interface 350 includes various information associated with the accident event, including a time, location, velocity (i.e., the velocity of the corresponding vehicle at the time of the accident), and a telematics event (as shown: strong brake event prior to the accident event). The interface 350 also indicates that the electronic device is retrieving additional data from nearby vehicles (or electronic devices associated therewith). The interface 350 includes an okay selection 351 that enables a user to select to dismiss the interface 350.

FIG. 3B illustrates an interface 355 indicating that additional data associated with the accident event was collected. In embodiments, the electronic device may display the interface 355 after displaying the interface (350) (i.e., after collecting the additional data). As illustrated in FIG. 3B, the interface 355 indicates additional data that was collected from nearby vehicles: an average velocity, an indication that vehicle ABC recorded damage, and images captured by the additional vehicles. The interface 355 further includes an okay selection 356 that enables the user to select to dismiss the interface 355.

Figure 4:
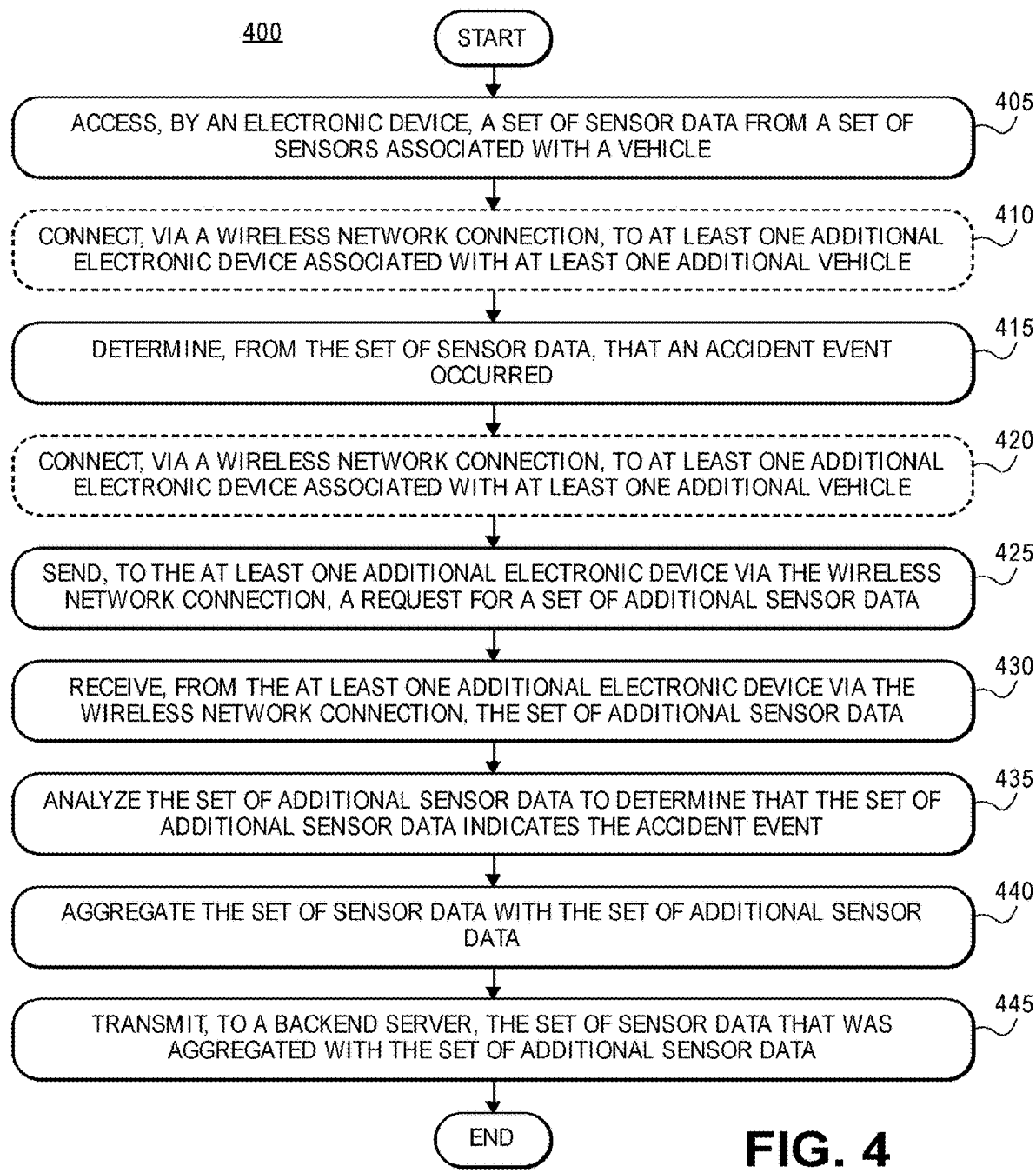
FIG. 4 is a flow diagram associated with assessing accident events, in accordance with some embodiments.

FIG. 4 depicts a block diagram of an exemplary method 400 of assessing accident events. The method 400 may be facilitated by an electronic device associated with a vehicle (such as vehicle device A 206) that may communicate with sensors associated with vehicles and with additional electronic devices associated with additional vehicles.

The method 400 may begin with the electronic device accessing (block 405) a set of sensor data from a set of sensors associated with the vehicle. In embodiments, the set of sensors may be incorporated within the electronic and/or may be external to the electronic device (e.g., sensors configured to collect telematics data associated with operation of the vehicle).

The electronic device may optionally connect (block 410), via a wireless network connection, to at least one additional electronic device associated with at least one additional vehicle. In embodiments, the wireless network connection may be a mesh network connection, and the electronic device may connect to the at least one additional electronic device automatically via the mesh network connection when within range. Accordingly, the at least one additional electronic device may transmit any gathered or supplemental sensor data to the electronic device via the wireless network connection at any point in time.

The electronic device may determine (block 415), from the set of sensor data, that an accident event occurred. In an implementation, the set of sensor data may indicate damage to the vehicle and/or to another vehicle. For example, the set of sensors may include a crash sensor that detects an accident event; or the set of sensors may include an image sensor that captures one or more digital images that depict vehicle damage. In embodiments, the electronic device may determine that the accident event occurred by determining that the set of sensor data is consistent with stored parameters corresponding to the accident event.

The electronic device may optionally connect (block 420), via a wireless network connection, to at least one additional electronic device associated with at least one additional vehicle. The wireless network connection of block 420 may be the same as the wireless network connection of block 410 (e.g., a mesh network connection). However, it should be appreciated that the electronic device may connect with the at least one additional electronic device at any point in time (i.e., before, concurrent with, or after determining that the accident event occurred). In an implementation, the electronic device may automatically connect to (or request to connect to) the additional electronic device in response to determining that the accident event occurred.

The electronic device may send (block 425), to the at least one additional electronic device via the wireless network connection, a request for a set of additional sensor data. In embodiments, the request may indicate a time and/or a location corresponding to the accident event, where the request may specify specific data according to the time and/or the location of the accident event. Further, in embodiments, the at least one electronic device may adjust its operation according to the request. For example, if the request specifies image data, an image sensor may orient itself in a direction of the accident event specified by the request.

The electronic device may receive (block 430), from the at least one additional electronic device via the wireless network connection, the set of additional sensor data. In an implementation, the at least one additional electronic device may send the set of additional sensor data that corresponds to the request. In another implementation, the at least one additional electronic device may automatically send the set of additional sensor data to the electronic device as the set of additional sensor data is collected.

The electronic device may analyze (block 435) the set of additional sensor data to determine that the set of additional sensor data indicates the accident event. For example, if the additional sensor data includes image data, the electronic device may determine that the image data depicts the vehicle. The electronic device may also aggregate (block 440) the set of sensor data with the set of additional sensor data. In particular, the electronic device may consolidate the sets of sensor data according to the type of sensor data, a recorded time of the sensor data, a recorded location of the sensor data, and/or other metrics.

The electronic device may also transmit (block 445), to a backend server, the set of sensor data that was aggregated with the set of additional sensor data. According to embodiments, the backend server (and/or the electronic device) may process the aggregated sets of sensor data according for various applications and according to various techniques.

Figure 5:
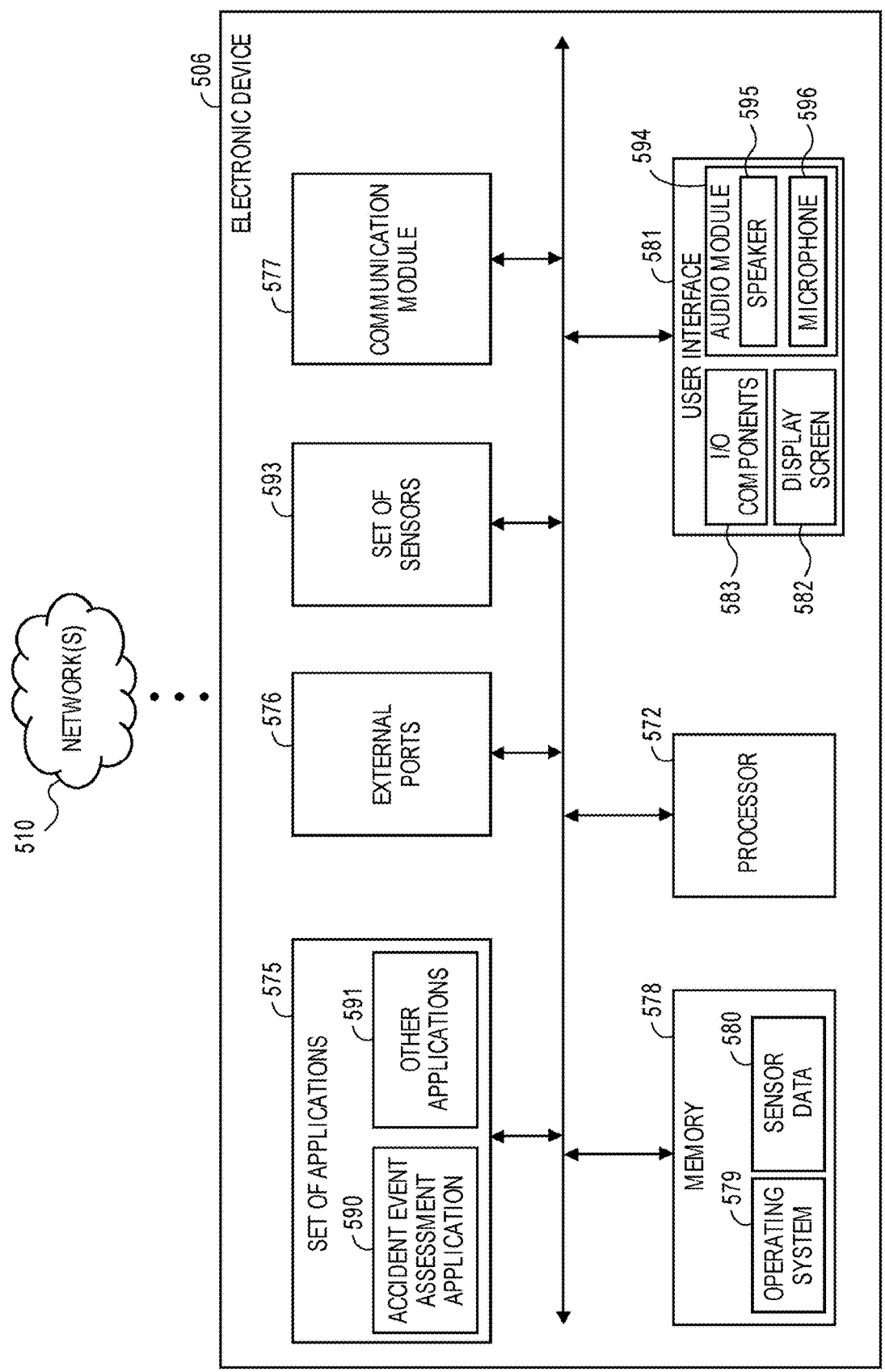
FIG. 5 is a block diagram of an exemplary electronic device, in accordance with some embodiments.

FIG. 5 illustrates a diagram of an exemplary electronic device 506 (such as vehicle device A 206 as discussed with respect to FIG. 2) in which the functionalities as discussed herein may be implemented. It should be appreciated that the electronic device 506 may be configured to be connect to and communicate with various entities, components, and devices, as discussed herein.

The electronic device 506 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an accident event assessment application 590 configured to assess accident events. It should be appreciated that one or more other applications 591 are envisioned.

The processor 572 may interface with the memory 578 to execute the operating system 579 and the set of applications 575. According to some embodiments, the memory 578 may also include sensor data 580 that may include various vehicle operating data associated with vehicles. In some implementations, the accident event assessment application 590 may interface with the sensor data 580 to retrieve and analyze relevant data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 506 may further include a communication module 577 configured to communicate data via one or more networks 510. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. For example, the communication module 577 may receive, via the network 510, sets of sensor data from electronic devices associated with vehicles.

The electronic device 506 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs). According to some embodiments, the user may access the electronic device 506 via the user interface 581 to review information and/or perform other functions. The user interface 581 may also include an audio module 594 that may include a speaker 595 and a microphone 596.

The electronic device 506 may further include a set of sensors 593 such as one or more accelerometers, gyroscopes, imaging sensors, proximity sensors, collision sensors, damage sensors, ultrasonic sensors, and location modules. The set of sensors 593 may also include other types of sensors such as light sensors, infrared sensors, touch sensors, NFC components, and other sensors.

In some embodiments, the electronic device 506 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method implemented by one or more processors for assessing accident events, the computer-implemented method comprising:
   determining, based on first sensor data captured by one or more first sensors associated with a first vehicle, that an accident event occurred; and
   after determining that the accident event occurred:
     sending, to an electronic device associated with a second vehicle, a request for second sensor data captured by one or more second sensors of the electronic device associated with the second vehicle;
     receiving, from the electronic device, the second sensor data;
     analyzing the second sensor data to determine that the second sensor data is related to the accident event; and
     aggregating the first sensor data with the second sensor data.

2. The computer-implemented method of claim 1, wherein the first sensor data captured by the one or more first sensors comprises at least one of:
   images depicting that the accident event occurred;
   audio indicating that the accident event occurred; or
   telematics data regarding vehicle operating conditions before or after the accident event.

3. The computer-implemented method of claim 1 further comprising:
   determining that the second vehicle was located within a threshold range of the first vehicle before sending the request to the electronic device associated with the second vehicle.

4. The computer-implemented method of claim 1, wherein the second sensor data comprises data recorded over a time period comprising before and during an occurrence of the accident event.

5. The computer-implemented method of claim 1, wherein the second sensor data comprises:
   data from one or more image sensors of the electronic device associated with the second vehicle, wherein the one or more second sensors comprise the one or more image sensors.

6. The computer-implemented method of claim 1, wherein the second sensor data comprises image data depicting at least one of: the accident event or vehicles adjacent to the accident event.

7. The computer-implemented method of claim 1 further comprising:
   displaying, on a user interface, other data collected by other electronic devices associated with other vehicles within a threshold range of the accident event, wherein the other data comprises at least one of:
     an average velocity of the other vehicles;
     vehicle damage corresponding to the accident event; or
     images captured by other sensors of the other electronic devices associated with the other vehicles.

8. A system comprising one or more processors and one or more non-transitory computer-readable media storing computing instructions that, when executed on the one or more processors, cause the one or more processors to perform operations comprising:
   determining, based on first sensor data captured by one or more first sensors associated with a first vehicle, that an accident event occurred; and
   after determining that the accident event occurred:
     sending, to an electronic device associated with a second vehicle, a request for second sensor data captured by one or more second sensors of the electronic device associated with the second vehicle;
     receiving, from the electronic device, the second sensor data;
     analyzing the second sensor data to determine that the second sensor data is related to the accident event; and
     aggregating the first sensor data with the second sensor data.

9. The system of claim 8, wherein the first sensor data captured by the one or more first sensors comprises at least one of:
   images depicting that the accident event occurred;
   audio indicating that the accident event occurred; or
   telematics data regarding vehicle operating conditions before or after the accident event.

10. The system of claim 8, wherein the operations further comprise:

determining that the second vehicle was located within a threshold range of the first vehicle before sending the request to the electronic device associated with the second vehicle.

11. The system of claim 8, wherein the second sensor data comprises data recorded over a time period comprising before and during an occurrence of the accident event.

12. The system of claim 8, wherein the second sensor data comprises:
   data from one or more image sensors of the electronic device associated with the second vehicle, wherein the one or more second sensors comprise the one or more image sensors.

13. The system of claim 8, wherein the second sensor data comprises image data depicting at least one of: the accident event or vehicles adjacent to the accident event.

14. The system of claim 8, wherein the operations further comprise:
   displaying, on a user interface, other data collected by other electronic devices associated with other vehicles within a threshold range of the accident event, wherein the other data comprises at least one of:
   an average velocity of the other vehicles;
   vehicle damage corresponding to the accident event; or
   images captured by other sensors of the other electronic devices associated with the other vehicles.

15. One or more non-transitory computer-readable media storing computing instructions that, when executed by one or more processors, cause the one or more processors to perform operations comprising:
   determining, based on first sensor data captured by one or more first sensors associated with a first vehicle, that an accident event occurred; and
   after determining that the accident event occurred:
      sending, to an electronic device associated with a second vehicle, a request for second sensor data captured by one or more second sensors of the electronic device associated with the second vehicle;
      receiving, from the electronic device, the second sensor data;
      analyzing the second sensor data to determine that the second sensor data is related to the accident event; and
      aggregating the first sensor data with the second sensor data.

16. The one or more non-transitory computer-readable media of claim 15, wherein the first sensor data captured by the one or more first sensors comprises at least one of:
   images depicting that the accident event occurred;
   audio indicating that the accident event occurred; or
   telematics data regarding vehicle operating conditions before or after the accident event.

17. The one or more non-transitory computer-readable media of claim 15, wherein the operations further comprise:
   determining that the second vehicle was located within a threshold range of the first vehicle before sending the request to the electronic device associated with the second vehicle.

18. The one or more non-transitory computer-readable media of claim 15, wherein the second sensor data comprises data recorded over a time period comprising before and during an occurrence of the accident event.

19. The one or more non-transitory computer-readable media of claim 15, wherein the second sensor data comprises:
   data from one or more image sensors of the electronic device associated with the second vehicle, wherein the one or more second sensors comprise the one or more image sensors, and wherein the second sensor data further comprises image data depicting at least one of: the accident event or vehicles adjacent to the accident event.

20. The one or more non-transitory computer-readable media of claim 15, wherein the operations further comprise:
   displaying, on a user interface, other data collected by other electronic devices associated with other vehicles within a threshold range of the accident event, wherein the other data comprises at least one of:
   an average velocity of the other vehicles;
   vehicle damage corresponding to the accident event; or
   images captured by other sensors of the other electronic devices associated with the other vehicles.

* * * * *